(No Model.)
J. C. ADSIT.
FILTER.
No. 252,858. Patented Jan. 31, 1882.
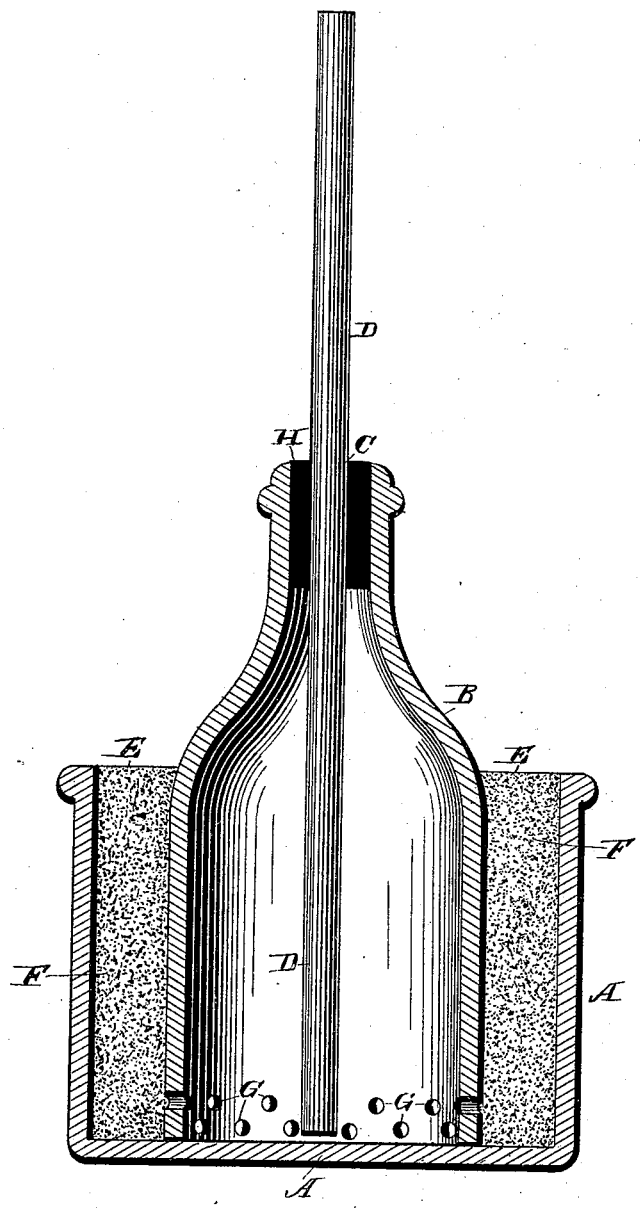
WITNESSES
E. S. Nottingham,
E. S. Seymour.
INVENTOR
John C. Adsit.
By H. A. Seymour.
ATTORNEY

UNITED STATES PATENT OFFICE.

JOHN C. ADSIT, OF OLEAN, NEW YORK.

FILTER.

SPECIFICATION forming part of Letters Patent No. 252,858, dated January 31, 1882.

Application filed August 27, 1881. (No model.)

*To all whom it may concern:*

Be it known that I, JOHN C. ADSIT, of Olean, in the county of Cattaraugus and State of New York, have invented certain new and useful Improvements in Filters; and I do hereby declare the following to be a full, clear, and exact description of the invention, such as will enable others skilled in the art to which it pertains to make and use it, reference being had to the accompanying drawing, which forms part of this specification.

My invention relates to an improvement in earthenware filters, the object being to provide articles of this character which shall combine simplicity and cheapness of construction with durability and efficiency in use, and which shall be adapted to be supplied to the trade at a low initial cost.

With these ends in view my invention consists in certain details of construction and combinations of parts, as will be hereinafter described, and pointed out in the claims.

The accompanying drawing represents a view in vertical cross-section of a filter constructed in accordance with my invention.

A represents an open earthenware vessel adapted to receive a bottomless jug, B, of the same material, into the mouth C of which the pump-pipe D is inserted. A sufficient difference of diameter between the vessel A and jug B is provided for to form an annular chamber, E, between them, the said chamber being packed with charcoal, sand, or any other filtering material, F. The lower end of the jug B is encircled by perforations G to admit the water into it which has percolated through the outer vessel, A, and the filtering material; and to prevent any unfiltered water from obtaining access into the said jug its mouth should be tightly closed with cement, as designated in the drawing by H. As the filtered water in the jug B is withdrawn through the pipe D, a partial vacuum is produced in the jug, which hastens the filtration of a new supply of water into it.

The extreme simplicity of my filter enables it to be readily cleaned and supplied with fresh filtering material, and while it is particularly adapted to be used in cisterns, it is suitable for use in other situations.

If desired, instead of forming the receptacle A and jug B in separate pieces, I may form them integral with each other, and if the ware of which they are made is very porous and readily permeable by water, the perforations in the jug may be dispensed with. These and other similar changes may be made, if necessary, and therefore I would have it understood that I do not limit myself to the exact construction shown and described, but hold myself at liberty to make such slight changes and alterations as fairly fall within the spirit and scope of my invention.

Having fully described my invention, what I claim as new, and desire to secure by Letters Patent, is—

1. In a filter, the combination, with an earthenware vessel having an open top, of a bottomless jug of less diameter than the open vessel, and adapted to be placed within the latter to form an annular space to receive filtering material, and a pump-pipe extending through said jug, substantially as set forth.

2. In a filter, the combination, with an open-top earthenware vessel, of a bottomless jug provided with perforations surrounding the lower end, filtering material packed between the jug and outer vessel, and a pump-pipe extending through the jug and held therein in a water-tight manner, substantially as set forth.

In testimony that I claim the foregoing I have hereunto set my hand and seal this 12th day of August, 1881.

JOHN C. ADSIT. [L. S.]

Witnesses:
H. W. MOORE,
W. H. VOSS.